(12) United States Patent
Aso et al.

(10) Patent No.: US 9,127,643 B2
(45) Date of Patent: Sep. 8, 2015

(54) ROTARY MOTOR ACTUATOR AND HORIZONTAL AXIS WIND TURBINE

(75) Inventors: Toshiyuki Aso, Tokyo (JP); Tomoyuki Aida, Tokyo (JP); Akihiro Unno, Tokyo (JP); Yuki Hayashi, Tokyo (JP); Ayako Miyajima, Tokyo (JP); Kazuhiro Tani, Tokyo (JP)

(73) Assignee: THK CO., LTD., Tokyo (JP)

( * ) Notice: Subject to any disclaimer, the term of this patent is extended or adjusted under 35 U.S.C. 154(b) by 505 days.

(21) Appl. No.: 13/508,270

(22) PCT Filed: Sep. 14, 2010

(86) PCT No.: PCT/JP2010/065805

§ 371 (c)(1),
(2), (4) Date: Jun. 27, 2012

(87) PCT Pub. No.: WO2011/055592

PCT Pub. Date: May 12, 2011

(65) Prior Publication Data

US 2012/0261920 A1    Oct. 18, 2012

(30) Foreign Application Priority Data

Nov. 4, 2009    (JP) .................................. 2009-253251

(51) Int. Cl.
*H02K 5/16*    (2006.01)
*F03D 7/02*    (2006.01)
(Continued)

(52) U.S. Cl.
CPC .......... *F03D 7/0204* (2013.01); *F03D 11/0008* (2013.01); *F16C 19/502* (2013.01);
(Continued)

(58) Field of Classification Search
CPC ....... H02K 7/08; H02K 5/1737; H02K 5/173; H02K 41/0358
USPC .................................................. 310/12.31, 90
See application file for complete search history.

(56) References Cited

U.S. PATENT DOCUMENTS 4,557,532 A    12/1985    Teramachi
5,844,341 A *  12/1998    Spooner et al. ............... 310/112
(Continued)

FOREIGN PATENT DOCUMENTS

GB    2248893 A    4/1992
JP    52-3102 A    1/1977
(Continued)

OTHER PUBLICATIONS

Machine Translation, Naoi et al., JP 2004301031 A, Oct. 28, 2004.*
(Continued)

*Primary Examiner* — Thomas Truong
(74) *Attorney, Agent, or Firm* — Westerman, Hattori, Daniels & Adrian, LLP

(57) ABSTRACT

A rotary moto actuator with a base 22, a table 21, a stator 25 and a rotor 26 of a rotary motor 31 and a first member 12 and a second member 14 of a guide mechanism 24 that have a plurality of base segments 22*a*, a plurality of table segments 21*a*, a plurality of stator segments 25*a*, a plurality of rotor segments 26*a*, a plurality of first member segments 12*a* and a plurality of second member segments 14, respectively, which all arranged circumferentially around a center line C. The stator segments 25*a* are connected to the base segments 22*a*, to which the first member segments 12*a* are connected. The rotor segments 26*a* are connected to the table segments 21*a*, to which the second member segments 14*a* are connected.

7 Claims, 7 Drawing Sheets

CROSS SECTION III-III

(51) Int. Cl.
- H02K 5/173 (2006.01)
- F03D 11/00 (2006.01)
- H02K 1/14 (2006.01)
- H02K 7/14 (2006.01)
- H02K 41/02 (2006.01)
- F16C 19/50 (2006.01)
- F16C 29/06 (2006.01)
- H02K 7/18 (2006.01)

(52) U.S. Cl.
CPC .......... *F16C29/0623* (2013.01); *H02K 1/148* (2013.01); *H02K 5/173* (2013.01); *H02K 7/14* (2013.01); *H02K 41/02* (2013.01); *H02K 7/1838* (2013.01); *H02K 2213/12* (2013.01); *Y02E 10/721* (2013.01); *Y02E 10/722* (2013.01); *Y02E 10/723* (2013.01); *Y10T 29/49009* (2015.01)

(56) References Cited

U.S. PATENT DOCUMENTS

| | | | |
|---|---|---|---|
| 6,452,302 B1 | 9/2002 | Tajima et al. | |
| 6,717,312 B1 * | 4/2004 | Kaplan et al. | 310/91 |
| 7,091,636 B2 * | 8/2006 | Ohno | 310/67 R |
| 7,202,584 B2 * | 4/2007 | Ida | 310/156.32 |
| 2002/0089251 A1 | 7/2002 | Tajima et al. | |
| 2010/0284641 A1 * | 11/2010 | Aida | 384/507 |

FOREIGN PATENT DOCUMENTS

| | | | |
|---|---|---|---|
| JP | 59-208218 A | | 11/1984 |
| JP | 04-105885 A | | 4/1992 |
| JP | 2000-224790 A | | 8/2000 |
| JP | 2004-301031 A | | 10/2004 |
| JP | 2007-107411 A | | 4/2007 |
| JP | 2009-024842 A | | 2/2009 |
| JP | 2009024842 A | * | 2/2009 |
| WO | 2009/041311 A1 | | 4/2009 |
| WO | 2009/078308 A1 | | 6/2009 |

OTHER PUBLICATIONS

"segment, n." OED Online. Oxford University Press, Sep. 2014. Web. Oct. 3, 2014.*

Machine Translation, Teramachi et al., JP 2009024842 A, Feb. 5, 2009.*

International Search Report for PCT/JP2010/065805, dated Nov. 22, 2010.

* cited by examiner

CROSS SECTION III-III

CROSS SECTION V-V

ROTARY MOTOR ACTUATOR AND HORIZONTAL AXIS WIND TURBINE

TECHNICAL FIELD

The present invention relates to a rotary motor actuator that has a table rotating relative to a base around a predetermined center line, and to a horizontal axis wind turbine with the rotary motor actuator built therein.

BACKGROUND ART

A wind turbine is a device in which a rotor with aerofoils rotates by wind force thereby to convert wind energy to power of the rotor. The horizontal axis wind turbine is defined as a wind turbine in which the rotation axis of the rotor is located approximately in the horizontal plane. On the ground, a tower is installed to support the rotor at a predetermined height above the ground. At the upper part of the tower, a nacelle is arranged. In the nacelle, the rotation axis of the rotor, a power generator and a controller are accommodated. The power generator generates power upon receiving the rotational force of the rotor.

Between the tower and the nacelle, there is installed a yaw drive unit for turning the nacelle relative to the tower in the horizontal place in accordance with the wind direction in such a manner that the aerofoils are kept against the wind that varies in direction (for example, see PL1). A controller operates the yaw drive unit to control the deviation angle between the wind direction and the rotation axis of the rotor to be a predetermined angle or less. The yaw drive unit has a large ring-shaped gear provided in the tower and a geared motor with pinion provided in the nacelle. The pinion of the geared motor engages with the ring gear of the tower. When the geared motor is turned, the pinion rotates on its axis and rotates around the ring gear. With rotation of the pinion, the nacelle turns in the horizontal plane.

CITATION LIST

Patent Literature

PL1: Japanese Patent Application Laid-Open No. 2007-107411

SUMMARY OF INVENTION

Technical Problem

As the gears engage with each other, there exist backlash between the pinion and the gear. When the wind turbine is hit by blown wind or wind in the lateral direction, the backlash causes the pinion and the gear into friction, of which gear surfaces wear, sometimes resulting in early breakage.

If a direct drive system motor, which is capable of transmitting the motor rotation directly to the nacelle, is used, the transmission can be eliminated and the above-mentioned problem due to the backlash of the gears can be solved. However, a motor for maintaining the number of revolutions constantly low has a physical problem of upsizing in order to obtain necessary torque as compared with the motor with a high number of revolutions. When the motor is upsized, it is difficult to manufacture, and as the weight increases with size, the assembly process of the motor at the upper part of the tower becomes dangerous.

Then, the present invention aims to provide a rotary motor actuator capable of simplifying the manufacturing and assembly process and also provide a horizontal axis wind turbine with the rotary motor actuator built therein.

Solution to Problem

Hereinafter, explanation is made about the present invention.

In order to solve the above-mentioned problems, a first aspect of the present invention is a rotary motor actuator which has a table rotating relative to abase around a center line, comprising: a rotary motor that has a stator and a rotor opposed to the stator and is configured to rotate the table relative to the base around the center line; and a guide mechanism which has a first member and a second member mounted movable on the first member via a plurality of rolling elements and which guides rotation of the table relative to the base around the center line, wherein the base, the table, the stator, the rotor, the first member and the second member have a plurality of base segments, a plurality of table segments, a plurality of stator segments, a plurality of rotor segments, a plurality of first member segments and a plurality of second member segments, respectively, which are arranged in a circumferential direction around the center line, one of the stator segments and the rotor segments is connected to the base segments, and one of the first member segments and the second member segments is connected to the base segments, and the other of the stator segments and the rotor segments is connected to the table segments, and the other of the first member segments and the second member segments is connected to the table segments.

Another aspect of the present invention is a horizontal axis wind turbine having a yaw drive unit for turning a nacelle, which support a rotor, relative to a tower around a yaw axis in such a manner that a rotation axis of the rotor rotated by a wind force extends against wind, wherein the yaw drive unit has: a rotary motor that has a stator and a rotor opposed to the stator and is configured to rotate a table fixed to the nacelle relative to a base fixed to the tower around the yaw axis, and a guide mechanism which has a first member and a second member mounted movable on the first member via a plurality of rolling elements and which guides rotation of the table relative to the base around the yaw axis, the base, the table, the stator, the rotor, the first member and the second member have a plurality of base segments, a plurality of table segments, a plurality of stator segments, a plurality of rotor segments, a plurality of first member segments and a plurality of second member segments, respectively, which are arranged in a circumferential direction around the yaw axis, one of the stator segments and the rotor segments is connected to the base segments, and one of the first member segments and the second member segments is connected to the base segments, and the other of the stator segments and the rotor segments is connected to the table segments, and the other of the first member segments and the second member segments is connected to the table segments.

Advantageous Effects of Invention

According to the rotary motor actuator of the one aspect of the present invention, the segments of the rotary motor and the segments of the guide mechanism are first combined into modules, which are then assembled into the rotary motor actuator as a whole. With this structure, it is possible to facilitate the manufacture process of the large-sized rotary motor actuator.

According to the horizontal axis wind turbine of the other aspect of the present invention, the segments of the rotary motor and the segments of the guide mechanism are first combined into modules on the ground, which are then arranged circumferentially around the yaw axis and assembled, in the air (at the upper part of the tower), into the yaw drive unit as a whole. With this structure, it is possible to simplify the assembly process of the yaw drive unit in the air and also facilitate transfer of the modularized yaw drive unit to the air.

DESCRIPTION OF EMBODIMENTS

Figure 1:
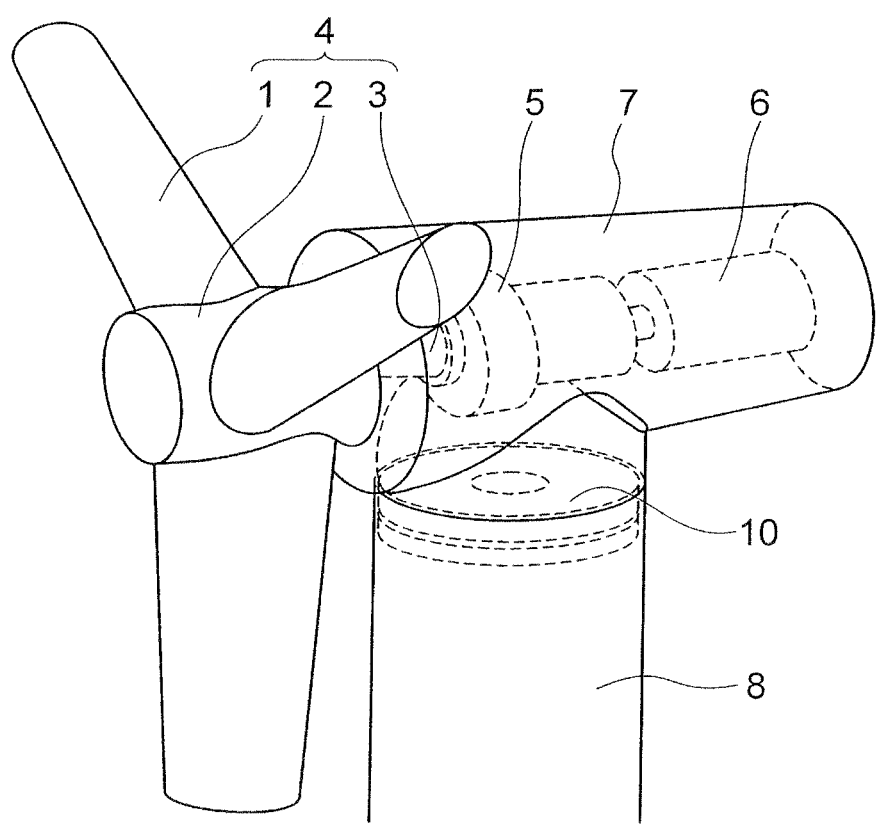
FIG. 1 is a perspective view of a horizontal axis wind turbine with a rotary motor actuator according to one embodiment of the present invention built therein.

With reference to the attached drawings, description will be made about a rotary motor actuator according to one embodiment of the present invention. FIG. 1 is a perspective view of a horizontal axis wind turbine in which the rotary motor actuator according to the one embodiment of the present invention is installed. This horizontal axis wind turbine is a device for rotating a rotor 4 with blades by wind force, and converting wind power energy into power for the rotor 4. The rotor 4 has a hub 2 that rotates around the horizontal rotation axis 3, a plurality of blades 1 arranged on the hub 2 radially, and a rotation axis 3 that transmits rotation of the hub 2 to a transmission 5. The hub 2 and plural blades 1 make up an aerofoil. The rotational force of the rotation axis 3 of the rotor 4 is transmitted via the transmission 5 to a power generator 6. The power generator 6 generates power upon receiving the rotational force of the rotor 4. The rotation axis 3 of the rotor 4, the transmission 5 and power generator 6 are accommodated in a nacelle 7.

On the ground, a tower 8 is installed to support the rotor 4 at the predetermined height. At the upper part of the tower 8, a nacelle 7 is arranged rotatable around the vertical axis. Between the tower 8 and the nacelle 7, a yaw drive unit 10 is arranged that turns the nacelle 7 in the horizontal plane. The yaw drive unit 10 turns the nacelle 7 in the horizontal plane in accordance with the wind direction in such a manner that the aerofoils of the rotor 4 are kept against the wind that varies in direction. A controller (not shown) stored in the nacelle 7 operates the yaw drive unit 10 to control a deviation angle between the wind direction and the rotation axis 3 of the rotor 4 to be a predetermined angle or less. The rotary motor actuator according to the one embodiment of the present invention is arranged between the tower 8 and the nacelle 7 to function as the yaw drive unit 10.

Figure 2:
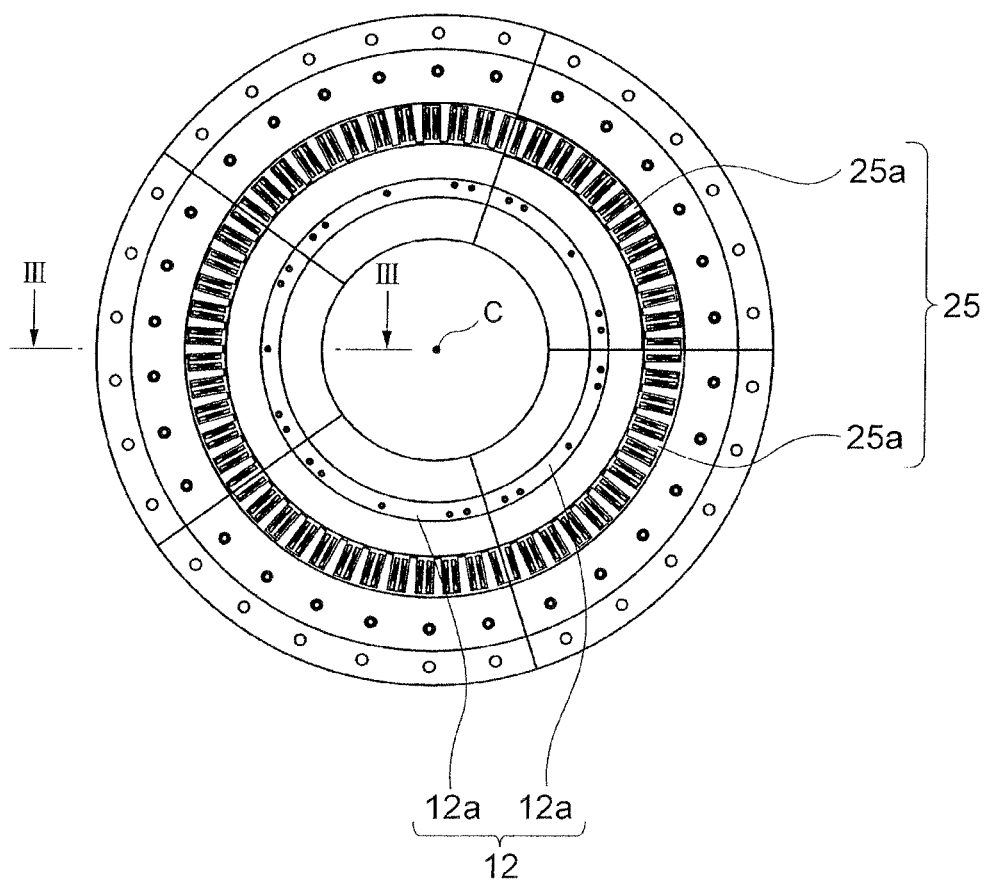
FIG. 2 is a plan view of a base side unit of the rotary motor actuator.
Figure 3:
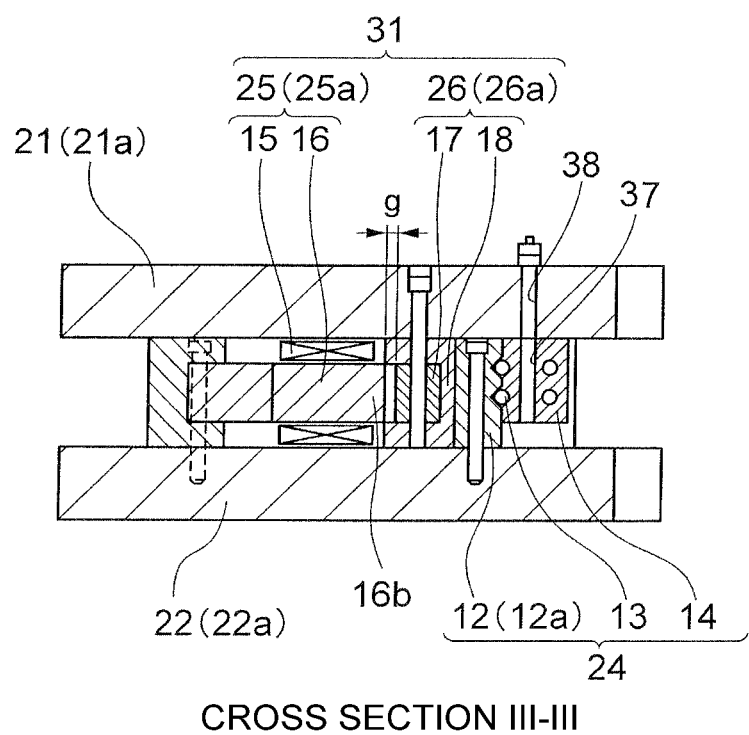
FIG. 3 is a cross sectional view of the rotary motor actuator (taken along the line III-III of FIG. 2)

The horizontal axis wind turbine has a base side unit which is fixed to the tower 8 and a table side unit which is fixed to the nacelle side. FIG. 2 is a plane view of the base side unit of the rotary motor actuator and FIG. 3 is a cross sectional view of the rotary motor actuator. Between the base 22 of the rotary motor actuator and the table 21, the rotary motor 31 and the guide mechanism 24 are arranged. On the base 22, a ring-shaped stator 25 of the rotary motor 31 is connected thereto. On the table 21, a ring-shaped rotor 26 of the rotary motor 31 is connected thereto.

Connected to the base 22 is a ring-shaped raceway rail 12 as the first member inside the ring-shaped stator 25. On the table 21, plural moving blocks 14 are connected as second members. The moving block 2 14 are mounted on the raceway rail 12 movable in the circumferential direction (see FIG. 7). The base side unit and the table side unit are equally split into, for example, five modules in this embodiment. In other words, the five modules are arranged circumferentially around the center line C of rotation of the rotary motor 31.

Figure 4:
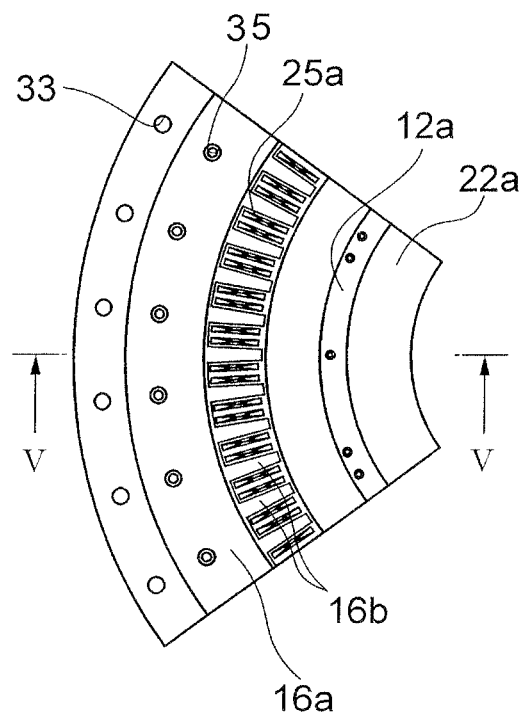
FIG. 4 is a plan view of a base side module.
Figure 5:
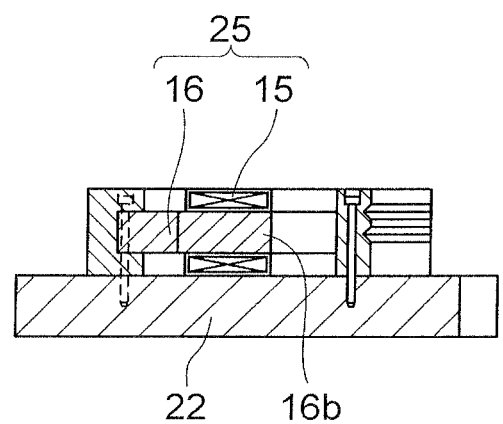
FIG. 5 is a cross sectional view of the base side module (taken along the line V-V of FIG. 4)
Figure 6:
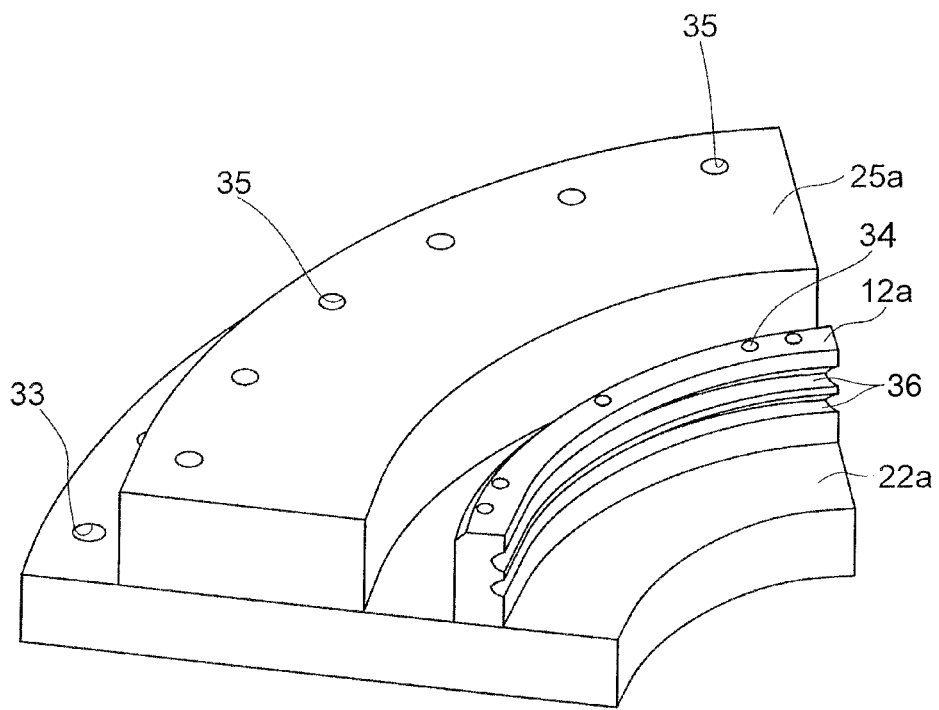
FIG. 6 is a perspective view of the base side module.

FIG. 4 is a plan view of the base side module, FIG. 5 is a cross sectional view thereof and FIG. 6 is a perspective view thereof. The base side module has a base segment 22a split into a sector, an arc-shaped stator segment 25a connected to the upper surface of the base segment 22a, and an arc-shaped raceway rail segment 12a connected to the inside of the stator segment 25a on the upper surface of the base segment 22a. That is, in the base side module, the stator segment 25a and the raceway rail segment 12a are combined into one piece. The base segment 22a is one obtained by splitting the ring-shaped stator 25 into five. The raceway rail segment 12a is one obtained by splitting the ring-shaped raceway rail 12 into five. The base 22, the stator 25 and the raceway rail 12 are equal in the number of split parts (five in this embodiment), and the stator segments 25a and the raceway rail segments 12a are the respective base segments 22a.

The base segment 22a is formed into a sector shape. When five base segments 22a are combined, the ring-shaped base 22 is configured. In the outer rim of the base segment 22a, through holes 33 are formed to connect the base segment 22 to the upper part of the tower 8. The base segment 22 is connected to the tower 8 by passing a bolt into each through hole 33 and tightening the bolt to the upper part of the tower 8.

On the upper surface of the base segment 22a, the arc-shaped stator segment 25a is connected thereto. The stator segment 25a is a core 16 made of a magnetic material wound with plural coils 15. The core 16 has an arc-shaped main body 16a and a plurality of salient poles 16b jutting from the main body 16a radially to the inside (see FIG. 4). Each of salient poles 16b is wound with the coils 15. The ring-shaped stator 25 is split equally and circumferentially and all the stator segments 25a are equal in circumferential length.

Every three coils 15 form one coil group of three-phase (U, V and W phases) coils. When three-phase alternate current of which phase is 120-degree shifted from each other flows into the three-phase coils 15, a moving magnetic field moving in the circumferential direction is generated on the salient poles 16b of the core 16. The plural salient poles 16b of this core 16 faces rotor segment 26a made of field permanent magnet, which is described later, in such a manner as to create a magnetic gap therebetween. The stator segment 26a is given thrust by the moving magnetic field generated at the salient poles 16b of the core 16 and turns around the center line C of the base 22 (see FIG. 2). As illustrate d in FIG. 4, in the main body 16a of the core 16, through holes 35 are formed. The stator segment 25a is connected to the base segment 22a by passing a bolt into each through hole 35 and tightening the volt to the base segment 22a.

As illustrated in FIG. 6, the arc-shaped raceway rail segment 12a is connected to the inside of the stator segment 25a on the upper surface of the base segment 22a. In the inner peripheral surface of the raceway rail segment 12a, two, upper and lower, rolling-element rolling grooves 36 are formed along the circumferential direction for rolling balls as rolling elements. The number of rolling-element rolling grooves 36 may be determined appropriately in accordance with load to bear. Each rolling-element rolling groove 36 has a cross sectional shape of combined two arcs, that is Gothic arch groove. Balls 13 (see FIG. 3) interposed between the raceway rail segment 12a and the moving block 14 are in two-point contact with the Gothic arch groove. In the raceway rail segment 12a, through holes 34 are formed. The raceway rail segment 12a is connected to the base segment 22a by passing a bolt into each through hole 34 an tightening the bolt to the base segment 22a.

As illustrated in FIG. 3, the table 21 is split into five table segments 21a. The rotor 26 connected to the table 21 is also split into five rotor segments 26a. The table 21 and the rotor 26 are equal in the number of splits parts and each rotor segment 26a is connected to a corresponding table segment 21a.

The planar shape of the rotor segment 26a connected to the bottom surface of the table segment 21a is an arc. The rotor segment 26a is arranged radially outside the raceway rail segment 12a and radially inside the stator segment 25a. Between the rotor segment 26a and the stator segment 25a, there is created a magnetic gap g. In order to prevent interference between the raceway rail segment 12a and the rotor segment 26a, a small gap is also created between the raceway rail 12a and the rotor segment 26a.

The rotor segment 26a has a yoke 18 that is made of a magnetic material and has a U-shaped cross section and permanent magnets 17 arranged in the groove of the yoke 18. The yoke 18 extends in the circumferential direction and the plural permanent magnets 17 are arranged in the groove of the yoke 18 in the circumferential direction. Each permanent magnet 17 is magnetized radially. Plural permanent magnets are arranged in such a manner that N poles and S poles are formed alternately in the circumferential direction on the outer periphery of the rotor segment 26a. The rotor 26 is split circumferentially and equally and all the rotor segments 26 are equal in circumferential length.

Figure 7:
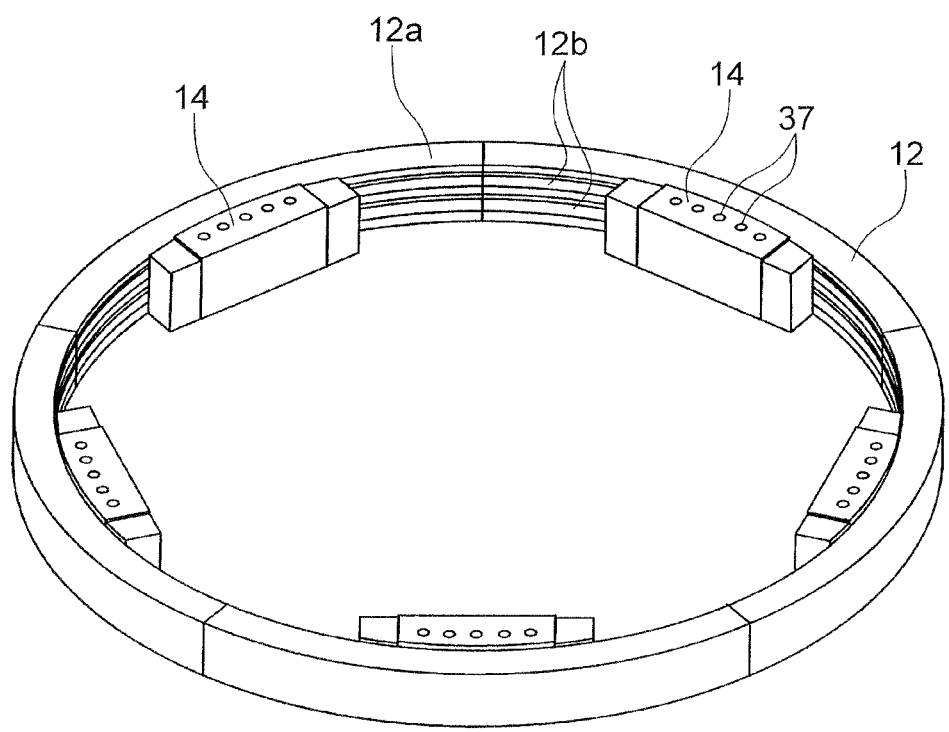
FIG. 7 is a perspective view illustrating plural moving blocks 14 arranged on a ring-shaped raceway rail.

On the lower surface of the table segment 21a, the moving block 14 is connected thereto. FIG. 7 illustrates plural moving blocks 14 arranged on the ring-formed raceway rail 12. On the inner peripheral surface of the raceway rail in the assembly state, plural, for example, five moving blocks 14 are arranged equally separated from each other in the circumferential direction. The moving blocks 14 cooperate with the raceway rail 12 to guide the table 21 rotating relative to the base 22 around the center line C. As the plural moving blocks 14 are arranged on the raceway rail 12 equally separated from each other, it is possible to equally bear loads in 360-degree all directions on the table 21.

As described above, the table side module has a table segment 21a, a rotor segment 26a connected to the lower surface of the table segment 21a and the moving block 14 connected to the lower surface of the table segment 21a. That is, in the table side module, the rotor segment 26a and the moving block 14 are combined into one piece.

Here, in this embodiment, five moving blocks 14 are connected to five table segments 21a. However, there is no need to connect all the table segments 21a to the moving blocks 14, and some table segments 21a may be not connected to the moving blocks 14 or one table segment 21a may be connected two or more moving blocks 14. The number of moving blocks 14 may be two or more. If the number of table segments 21a differs from the number of moving blocks 14, it is possible to avoid the possibility that all the moving blocks 14 are arranged at joints of the raceway segments 12a and thereby to smooth rotation of the table 21.

In the upper surface of the moving block 14, a plurality of tap holes 27 is formed. As illustrated in FIG. 3, a bolt is passed through a through hole 38 of the table segment 21a and the bolt is fit in the tap hole 37 of the moving block 14 thereby to connect the moving block 14 to the table segment 21a.

Figure 8:
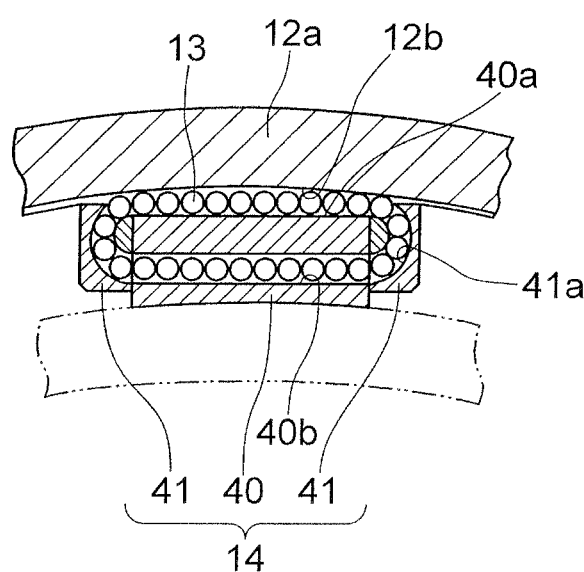
FIG. 8 is a horizontal cross sectional view of a moving block.

FIG. 8 is a horizontal cross sectional view of the moving block 14. The moving block 14 is arranged in such a manner as to face the inner peripheral surface of the raceway rail segment 12a and it is mounted on the raceway rail segment 12a via plural balls 13 rolling on the rolling-element rolling groove 12b of the raceway rail segment 12a. Each moving block 14 has a block main body 40 and end plates 41a fixed to both ends of the block main body 40. In the block main body 40, two, upper and lower, loaded rolling-element rolling grooves 40a are formed opposed to the two, upper and lower, rolling-element rolling grooves 12b of the raceway rail segment 12a. Each loaded rolling-element rolling groove 40a has across sectional shape composed of two arcs and it is a so-called Gothic arch groove. A loaded rolling-element rolling path is formed between the rolling-element rolling groove 12b of the raceway rail segment 12a and the loaded rolling-element rolling groove 40a of the moving block 14. The balls 13 roll, under load, on this loaded rolling-element rolling path.

In the moving block main body 40, a rolling-element return path 40b is formed approximately in parallel to the loaded rolling-element rolling groove 40a. In each end plate 41, a U-shaped direction change path 41a is formed that connects the loaded rolling-element rolling groove 40a of the moving block main body 40 to the rolling-element return path 40b. The rolling-element return path 40b and the paired U-shaped direction change paths 41a form an unloaded return path that connects one end of the loaded rolling-element rolling groove 40a to the other end. Once the paired endplates 41 are secured to the moving block main body 40, a circuitry rolling-element circulation path is completed. Here, in the assembled state, supporting means such as pressure rings may be arranged inside the moving block 14 in order to prevent the moving block 14 from being separated from the raceway rail 12.

As described above, after the base side modules are assembled one by one (in other words, the raceway rail segments 12a and the stator segments 25a are connected to the respective base segments 22a), the plural base segments 22a are arranged in the circumferential direction around the center line C and combined. Then, the arc-shaped stator segments 25a are connected together into a ring-shaped stator 25. Besides, the arc-shaped raceway rail segments 12a are connected together into a ring-shaped raceway rail 12.

In the same way, after the table side modules are assembled one by one (in other words, the rotor segments 26a and the moving blocks 14 are connected to the respective table segments 21a), the plural table segments 21a are arranged in the circumferential direction around the center line C and combined. Then, the arc-shaped rotor segments 26a are connected together into a ring-shaped rotor 26. When the moving blocks 14 are mounted on the raceway rail 12, the rotary motor actuator is completed. When three-phase alternate current flows into coils 15 as the stator in this state, a rotational force is given to the table 21 so that the table 21 rotates relative to the base 22.

When the above-described rotary motor actuator is mounted on the horizontal axis wind turbine, first, the plural base side modules are assembled one by one on the ground and prepared as tower side modules. And, the plural table side modules are assembled one by one and prepared as nacelle side modules.

Next, at the upper part of the tower installed on the ground, the plural tower side modules are arranged in the circumferential direction around the yaw axis and combined integrally. With this process, the arc-shaped stator segments 25a are connected together into the ring-shaped stator 25. Besides, the arc-shaped raceway rail segments 12a are connected together into the ring-shaped raceway rail 12.

Then, at the upper part of the tower installed on the ground, the plural nacelle side modules are arranged in the circumferential direction around the yaw axis and combined together. With this process, the arc-shaped rotor segments 26a are connected together into the ring-shaped rotor 26. Then, the moving blocks 14 are mounted on the raceway rail 12, the guide mechanism is completed.

As described above, according to this embodiment, the rotary motor actuator can be manufactured by first combining and assembling the segments of the rotary motor and segments of the guide mechanism into modules and then, arranging the plural modules in the circumferential direction around the center line. This process makes it easy to manufacture a large-sized rotary motor actuator.

As the curve guide having a curve raceway rail 12 and a plurality of moving blocks 14 mounted on the raceway rail 12 is used as the guide mechanism, it becomes easy to configure the guide mechanism comprised of circumferentially split parts.

As the base 22, the stator 25 and the raceway rail 12 are equal in the number of split parts and the stator segments 25a and raceway segments 12a are connected to the respective base segments 22a, manufacture of each module at the base side can be facilitated. Besides, as the table 21 and the stator 26 are equal in the number of split parts and the table segments 21a are connected to the respective rotor segments 26a, manufacture of each module at the table side can be facilitated.

As the rotary motor 31 is arranged radially outside the raceway rail 12, it is possible to increase the rotational force of the rotary motor 31.

As the raceway rail 12 is composed of plural arc-shaped raceway rail segments 12a split therefrom, it is possible to improve the material availability and eliminate the need to use a large-sized processing machine, as compared with the case of manufacturing an un-split ring-shaped raceway rail 12. This consequently facilitates the manufacturing process of the raceway rail itself.

When the rotary motor actuator of this embodiment is mounted in the horizontal axis wind turbine, the rotary motor segments and the guide mechanism segments are combined into respective modules on the ground and then, the modules are arranged in the circumferential direction around the yaw axis thereby to configure the yaw drive unit of the horizontal axis wind turbine. With this configuration, it is possible to simplify the assembly process of the yaw drive unit up in the air and also the transfer process of the modularized yaw drive unit to the air.

Here, the present invention is not limited to the above-mentioned embodiments and may be embodied in various forms without departing from the scope of the present invention. In the above-described embodiments, the base is a fixed side and the table is a movable side. However, these may be changed so that the table may be the fixed side and the base may be the rotation side. Further, the base and the table may be used flipped vertically.

Further, when it is used in a part which oscillates without making one turn, it can use combined modules corresponding to required angles and there is no need to combine all the modules into a ring.

Further, the guide mechanism used may be a slewing bearing that has an outer ring as a first member and an inner ring mounted on this outer ring via rolling elements, other than the curve guide. The first member segment may be an arc part as a part of the outer ring and the second member segment may be an arc part as a part of the inner ring.

Furthermore, the rotary motor may be arranged inside of the raceway rail. In this case, the rotary motor actuator may be more compact.

The present specification is based on Japanese Patent Applications No. 2009-253251 filed on Nov. 4, 2009, the entire contents of which are expressly incorporated by reference herein.

INDUSTRIAL APPLICABILITY

The rotary motor actuator of the present invention is applicable to the yaw drive unit for turning a rotation axis of a rotor of a horizontal axis wind turbine in the horizontal plane as well as a pitch drive unit for turning the rotation axis of the rotor in the vertical plane. Besides the wind turbine, it is applicable to a turning machine in which a driver seat or an upper frame is mounted turnable relative to a track frame as a lower structural element. It is also applicable to a turn table for turning a work such as a glass board for large-sized screen display.

REFERENCE NUMERALS

4 . . . rotor, 3 . . . rotation axis, 7 . . . nacelle, 8 . . . tower, 10 . . . yaw drive unit, 12 . . . raceway rail (first member), 12a . . . raceway rail segment (first member segment), 14 . . . moving block (second member segment), 21 . . . table, 21a . . . table segment, 22 . . . base, 22a . . . base segment, 24 . . . guide mechanism, 25 . . . stator, 25a . . . stator segment, 26 . . . rotor, 26a . . . rotor segment, 31 . . . rotary motor

The invention claimed is:

1. A rotary motor actuator which has a table rotating relative to a base around a center line, comprising:
   a rotary motor that has a stator and a rotor opposed to the stator and is configured to rotate the table relative to the base around the center line; and
   a guide mechanism which has a first member and a second member mounted movable on the first member via a plurality of rolling elements and which guides rotation of the table relative to the base around the center line,
   wherein the base, the table, the stator, the rotor, the first member and the second member have a plurality of base segments, a plurality of table segments, a plurality of stator segments, a plurality of rotor segments, a plurality of first member segments and a plurality of second member segments, respectively, which are arranged in a circumferential direction around the center line,
   one of the stator segments and the rotor segments is connected to the base segments, and one of the first member segments and the second member segments is connected to the base segments,
   the other of the stator segments and the rotor segments is connected to the table segments, and the other of the first member segments and the second member segments is connected to the table segments, and each of the plurality of segments of the base, the table, the stator, the rotor, the first member and the second member are physically split from each other into separate modules the base segments, the stator segments and the first member segments are equal in number, the stator segments and the first member segments are connected to the base segments, respectively, the table segments and the rotor segments are equal in number, and the rotor segments are connected to the table segments, respectively.

2. The rotary motor actuator of claim 1, wherein the first member segments are arc-shaped raceway rail segments in which rolling-element rolling grooves are formed, and the second member segments are moving blocks which have rolling-element circulation paths including loaded rolling-element rolling grooves opposed to the rolling-element rolling grooves of the raceway rail segments, the rolling elements being arranged circulatably in the rolling-element circulation paths.

3. The rotary motor actuator of claim 2, wherein the rotary motor is arranged radially outside the guide mechanism.

4. The rotary motor actuator of claim 1, wherein the rotary motor is arranged radially outside the guide mechanism.

5. A horizontal axis wind turbine having a yaw drive unit for turning a nacelle, which support a rotor, relative to a tower around a yaw axis in such a manner that a rotation axis of the rotor rotated by a wind force extends against wind, wherein the rotary motor actuator of claim 1 is used as the yaw drive unit.

6. A method for manufacturing a rotary motor actuator having a rotary motor that has a stator and a rotor opposed to the stator and is configured to rotate a table relative to a base around a center line, and a guide mechanism which has a first member and a second member mounted movable on the first member via a plurality of rolling elements and which guides rotation of the table relative to the base around the center line; the method comprising:

a base side module forming step of forming a base side module by connecting either a plurality of stator segments, which are parts of the stator, or a plurality of rotor segments, which are parts of the rotor, to a plurality of base segments, which are parts of the base, and by connecting either a plurality of first member segments, which are parts of the first member, or a plurality of second member segments, which are parts of the second member, to the plurality of base segments;

a table side module forming step of forming a table side module by connecting the other of the plurality of stator segments and the plurality of rotor segments to a plurality of table segments, which are parts of the table, and by connecting the other of the plurality of first member segments and the plurality of second member segments to the plurality of table segments;

a base side unit forming step of arranging a plurality of base side modules circumferentially around the center line to form one of the stator and the rotor and to form one of the first member and the second member; and a table side unit forming step of arranging a plurality of table side modules circumferentially around the center line to form the other of the stator and the rotor and to form the other of the first member and the second member, wherein each of the plurality of segments of the base, the table, the stator, the rotor, the first member and the second member are physically split from each other into separate modules, the base segments, the stator segments and the first member segments are equal in number, the stator segments and the first member segments are connected to the base segments, respectively, the table segments and the rotor segments are equal in number, and the rotor segments are connected to the table segments, respectively.

7. A method for manufacturing a horizontal axis wind turbine using a rotary motor actuator as a yaw drive unit for turning a nacelle, which support a rotor, relative to a tower around a yaw axis in such a manner that a rotation axis of the rotor rotated by a wind force extends against wind, wherein the method for manufacturing a rotary motor actuator of claim 6 is used for manufacturing the rotary motor actuator.

* * * * *